United States Patent [19]

Ishida et al.

[11] Patent Number: 4,646,144

[45] Date of Patent: Feb. 24, 1987

[54] METHOD AND APPARATUS FOR REPRODUCING COLOR SEPARATION PICTURE IMAGE

[75] Inventors: Akira Ishida; Akira Yumen; Naotada Saito, all of Kyoto, Japan

[73] Assignee: Dainippon Screen Mfg. Co., Ltd., Japan

[21] Appl. No.: 774,646

[22] Filed: Sep. 11, 1985

[30] Foreign Application Priority Data

| Feb. 9, 1985 | [JP] | Japan | 60-22792 |
| Feb. 9, 1985 | [JP] | Japan | 60-22793 |
| Feb. 9, 1985 | [JP] | Japan | 60-22795 |

[51] Int. Cl.⁴ .................................. H04N 1/46
[52] U.S. Cl. ............................ 358/75; 358/80
[58] Field of Search ............. 358/75, 76, 77, 78, 358/79, 80, 21 R

[56] References Cited

U.S. PATENT DOCUMENTS

| 3,739,078 | 6/1973 | Pugsley et al. | 358/80 |
| 3,878,559 | 4/1975 | Pugsley | 358/75 |
| 4,096,519 | 6/1978 | Hoffrichter et al. | 358/80 |
| 4,293,872 | 10/1981 | Keller et al. | 358/80 |
| 4,315,280 | 2/1982 | Tsuda | 358/80 |
| 4,319,268 | 3/1982 | Yamada | 358/75 |
| 4,402,007 | 8/1983 | Yamada | 358/80 |
| 4,558,356 | 12/1985 | Toda et al. | 358/80 |
| 4,564,859 | 1/1986 | Knop et al. | 358/80 |

*Primary Examiner*—Henry C. Yuen
*Attorney, Agent, or Firm*—Ostrolenk, Faber, Gerb & Soffen

[57] ABSTRACT

Each of original pictures is pasted up to a mask sheet in which respective trimming areas corresponding to each of said original pictures is transparent and other areas thereof are made of a material having high reflective coefficient, according to a desired layout, and the mask sheet is set up on the scanning drum of the colors scanner to carry out photoelectric scanning, and then a picked up signal basing on difference in scanning light beam reflection level between the trimmed areas of the original pictures and the areas having high reflective coefficient, is appropriately switched to exposingly record the desired color separation picture image and/or a mask pattern.

15 Claims, 14 Drawing Figures

METHOD AND APPARATUS FOR REPRODUCING COLOR SEPARATION PICTURE IMAGE

BACKGROUND OF THE INVENTION

(1) Field of the Invention

The present invention relates to a method and an apparatus for exposing and recording color separation picture by photoelectrically scanning an original picture, and particularly to those which record desired areas of the original color picture by trimming the original picture.

(2) Description of the Prior Art

In recent photomechanical process rationalization in manufacturing processes for plate making and layout sheet advances, and a layout scanner in which a large part of the process is effected electronically has been successfully implemented. However, the conventional techniques such as "manual composing process" in which films having been color separated from each of original color pictures are applied onto a base sheet manually is still widely utilized.

In order to make the manual composing processes more facile, a method for separating a plurality of color original pictures collectively in which in order to make color separation more facile the color original pictures themselves are applied onto the base sheet according to a desired layout, and then they are photoelectrically scanned has been disclosed, for example, Japanese Patent Laid-Open Publication No. 59-226348 (the corresponding foreign patent applications are U.S. Ser. No. 616,389, GB No. 84 13578, DE No. P-34 20 482.2 and FR No. 84 08837) etc.

Figure 11:
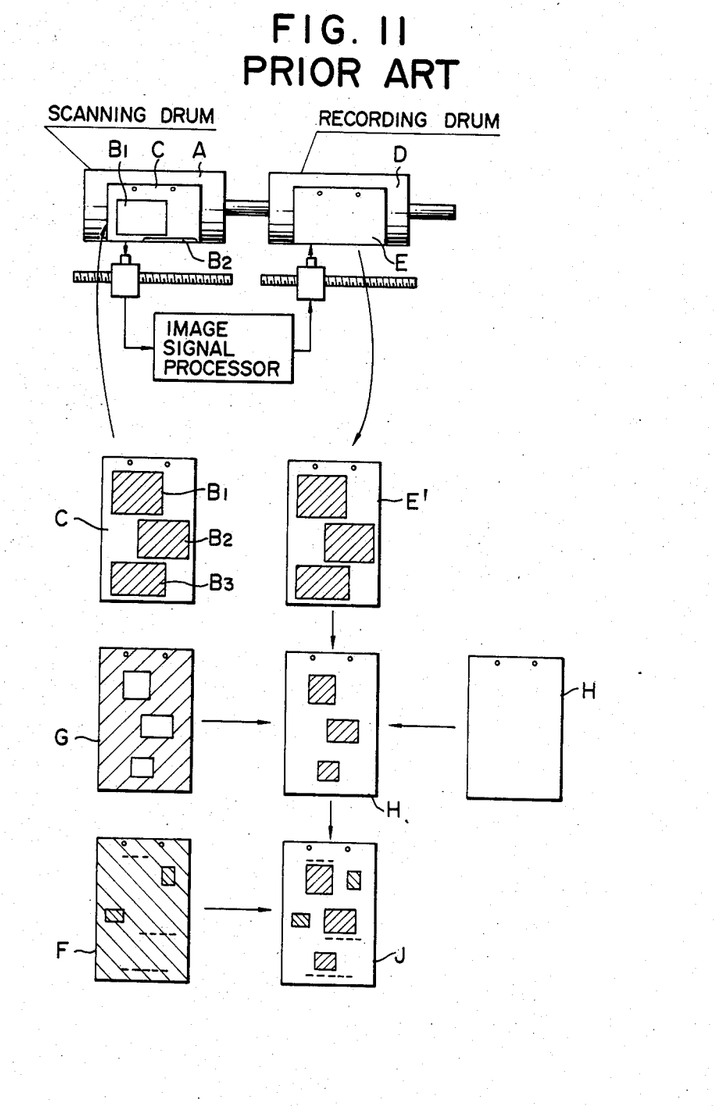
FIG. 11 is a view illustrating a conventional manner of recording an original picture(s) after trimming, and in case of need, by composing letters or patterns.

In the publicly known apparatus, as shown in FIG. 11, a base sheet (C) on which a plurality of color pictures (B1), (B2), and (B3) are applied to according to a predetermined layout is loaded on a scanning drum (A) of the color scanner and photoelectrically scanned, and the thus obtained reproduced picture images of these original pictures are recorded to a photographic film (E) loaded on a recording drum (D) as color separated halftone pictures with same size.

In this case, for the plurality of color pictures (B1), (B2) and (B3), secondary originals reproduced on a color duplication film or a paper from the respective original pictures with a magnification indicated in the layout by an appropriate duplication film are used, and in order to make it possible to simultaneously process by the color scanner, one set of the secondary originals pasted up on the same base (C), in case of necessity, a transparent film of a white paper register marks being attached, are arranged so that characteristics such as gradation, density range etc. are of the same degree.

In addition, in the case of letters or line drawings etc. being composed of the color pictures, negative films (F) thereof are made, and on the other hand, a trimming film (G) in which a desired area to be trimmed of the secondary originals is made to a window-like transparent portion and the other portion is made to an opaque is specially manufactured, and the base sheet (C) on which the secondary originals are pasted up and further overlapped with the trimming mask film (G) and the negative film (F) such as said letters etc. are carried out contact print on a new film (H). Thus, a positive film (J) composed of the original color pictures, letters etc., i.e., an original film for scanner working, is obtained.

In the above-described multiple contact printing work, a quite accurate registering is requested, and particularly, in the case of the pictures themselves being abuttedly disposed, a plurality of mask films are necessary and more further accurate registering is needed.

As another method, there is a scanning method in which the secondary originals duplicated from the original pictures are cut to desired trimming size and pasted on a transparent sheet, then the transparent sheet is loaded on a scanning drum of a color scanner on the surface of the transparent sheet, i.e., making the surface to the inside surface. However, in this method it is considerably difficult to cut practically the secondary originals to the desired size, and after color separation having been finished if there is any modification in the trimming size, other troublesome works to form the secondary originals again are necessary.

Further, in the Japanese Patent Laid-Open Publication No. 59-226343 filed by the very Applicant, there is disclosed another scanning method in which a desired rectangular trimming mask is electronically superposed to an original picture, and is exposed and recorded by scanning together with letters or line patterns. However, according to this method, configuration of trimming is limited to a rectangle, and can not be trimmed freely.

SUMMARY OF THE INVENTION

It is an object of the present invention is to record a color separation picture image trimmed by a color scanner.

Another object of the present invention is to provide a method and an apparatus for recording the color separation picture image trimmed to desired configuration.

A further object of the invention is to provide, in layout works to record by composing color separation picture image and letters or patterns, a method and an apparatus for performing layout of a plurality of color separation picture image by one process so that the number of times of multiple contact printings in which the post process is needed may be finished with the least number thereof.

The fundamental principle of the present invention is as follows: each of the original pictures is pasted up to a mask sheet in which respective trimming areas corresponding to each of said original pictures is transparent and other areas thereof are made high reflectivity, according to a desired layout, and the mask sheet is set up on the scanning drum of the color scanner to carry out photoelectric scanning, and then a picked up signal based on difference in scanning light beam reflection level between the trimmed areas of the original pictures and the high reflection mask areas, is appropriately switched to exposingly record the desired color separation picture image and/or a mask pattern.

In the first embodiment of the present invention, two kinds of photo-electric converting means are disposed in parallel for the purpose of color separating the original color picture and detecting the mask areas by the reflection level thereof, and by a detecting signal of the mask areas, signals output from the two photo-electric converting means are switched to control a scanning means at the recording side.

In the second embodiment of the present invention, two kinds of photo-electric converting means are disposed on the identical optical axis, and pick up scanning according to them is carried out twice separately and reproduced picture images by each of outputs are exposed and recorded on the same film.

In the third embodiment of the present invention, two kinds of photo-electric converting means are also disposed on the identical optical axis, and they perform pick up scanning simultaneously, and by a signal by which the second photo-electric converting means detects the mask areas, signals from the two photo-electric converting means are switched to control scanning means at the recording side.

Hereinafter, with reference to the accompanying drawings, these embodiments and other examples are described in further detail.

DETAILED DESCRIPTION OF THE INVENTION

Figure 1:
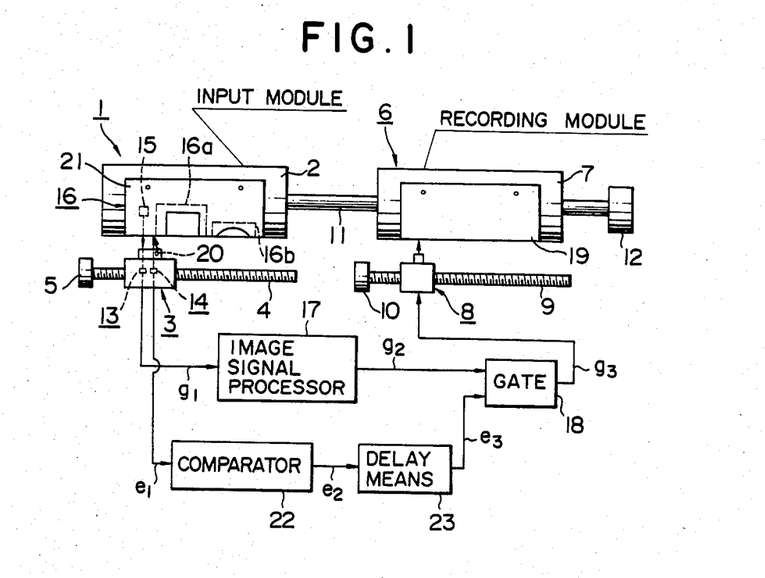
FIG. 1 is a block diagram of a color scanner to which the first embodiment of the present invention is applied.

Firstly, with reference to FIG. 1 the first embodiment of the present invention is described.

In an input module 1 of a color scanner there are provided a pickup drum 2, a pickup head 3, a feeding screw 4 for the pickup head 3 and a driving motor 5. On the other hand, in a recording module 6 there are provided a recording drum 7, a recording head 8 equipped with a halftone dot generating system, a feeding screw 9 for the recording head and a driving motor 10.

The pickup drum 2 and the recording drum 7 are revolved by a motor 12 which drives a common shaft 11, by which scanning is performed both at the input module 1 and the recording module 6.

The pickup head 3 comprises, as in a conventional usual color scanner, a first photoelectric cell 13 and a second photoelectric cell 14 which are provided for performing the present invention, that is, there are provided two sets of photoelectric converting means.

The first photoelectric cell 13 scans original pictures 16a and 16b pasted up on a base sheet 16 which is loaded on the pickup drum 2 mainly by a light source 15, and as in a conventional color scanner, outputs color separation signals (g1) comprising three color signals (r,g,b), that is, red (R), green (G) and blue (B), an unsharp signal (U) for enhancing contour of the picture image. Then the signals (g1) are output to a signal processing means 17 which carries out masking, color correction, gradation correction etc., as in a conventional color scanner.

An output (g2) of the signal processing means 17 is fed to the recording head 8 through a gate 18, and when the other input of this gate 18 is at a "low level", color separated picture images are exposed and recorded on a photosensitive film 19 which is loaded on the recording drum 7.

The second photoelectric cell 14 scans a base sheet 21 (white colored peel-off film) on which the original pictures 16a and 16b illuminated by a light source 20 for reflection pattern are pasted up, and its outputs (e1) is converted into a binary signal (e2) of a high or low level by a comparator 22 and sent to a one bit buffer memory 23 for delaying.

The first and the second photoelectric cell 13 and 14 are disposed at a spaced relation by several millimeters with each other in the sub-scanning direction, i.e., in axial direction of pick-up drum 2, (about 10 or several ten scanning lines), and in order to shield the first photoelectric cell 13 from light emitted from the light source 20 and reflected by the base sheet 16, a hood (not shown) is mounted. When the pickup head 3 is moved along the pickup drum 2 for scanning, the second cell 14 scans the base sheet 21 in advance of the first photoelectric cell 13.

The buffer memory 23 delays the signal (e2) for a time interval which comprises of a time necessary for the pickup head 3 being moved the distance between the two cells and a time required for processing at the signal processing means 17, and outputs as a signal (e3). That is, the delay time by the buffer memory (23) is selected so that the signals from the two cells which scanned the same point on the base sheet 21 may be fed to the gate 18 at the same time. The read out signal (e2) from the buffer memory 23 is input to the gate 18 control the to "ON-OFF" state of gate 18, and thereby control the "pass or stop" of the image signals (g2) output from the signal processing means 17.

When the signal (e3) is in the "H" (high level), the output (g3) of the gate 18 controls the recording head 8 so that it may expose the film 19 at the maximum intensity thereof. The maximum intensity is selected so that an exposed film area may become opaque after its having been subjected to developing treatment.

When the signal (e3) is in the "L" (low level), from the gate 18 the signal (g2) output from the signal processing means 17 passes, without being subjected to any modification. Thus, the color separation image signals are fed to the recording head 8 and halftone pictures of dot areas according to levels of the signals (g2) are exposed and recorded.

Figure 2:
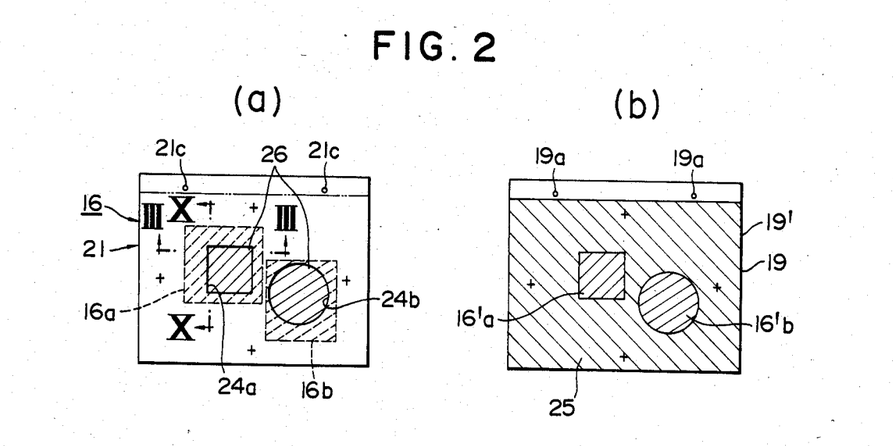
FIG. 2(a) is a view showing original pictures to be loaded on a scanning drum of a color scanner.
FIG. 2(b) is a view showing reproduced pictures.
Figure 3:
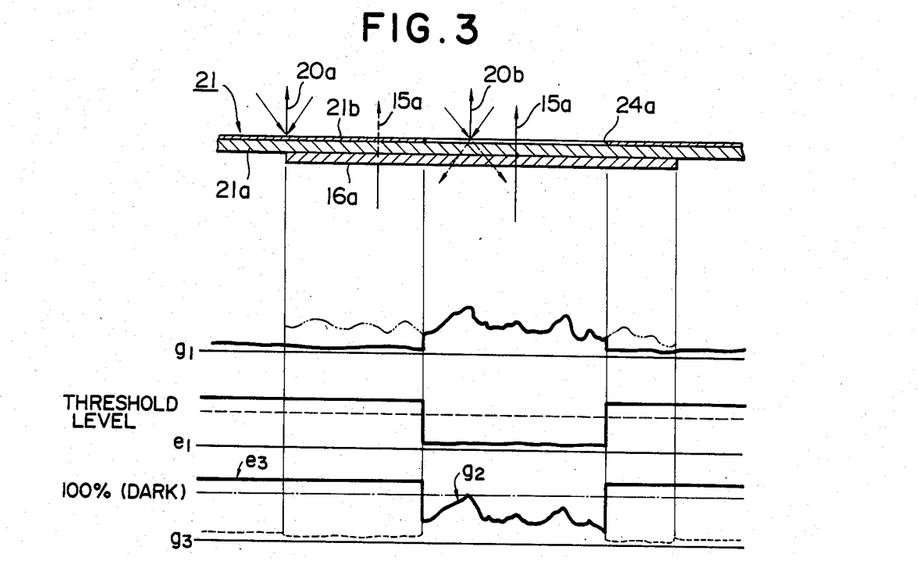
FIG. 3 shows a sectional view cut along III—III line of one of the original picture shown in FIG. 2(a) and wave-shape graphs of photo-electric converting signals at the sectioned part.
Figure 4:
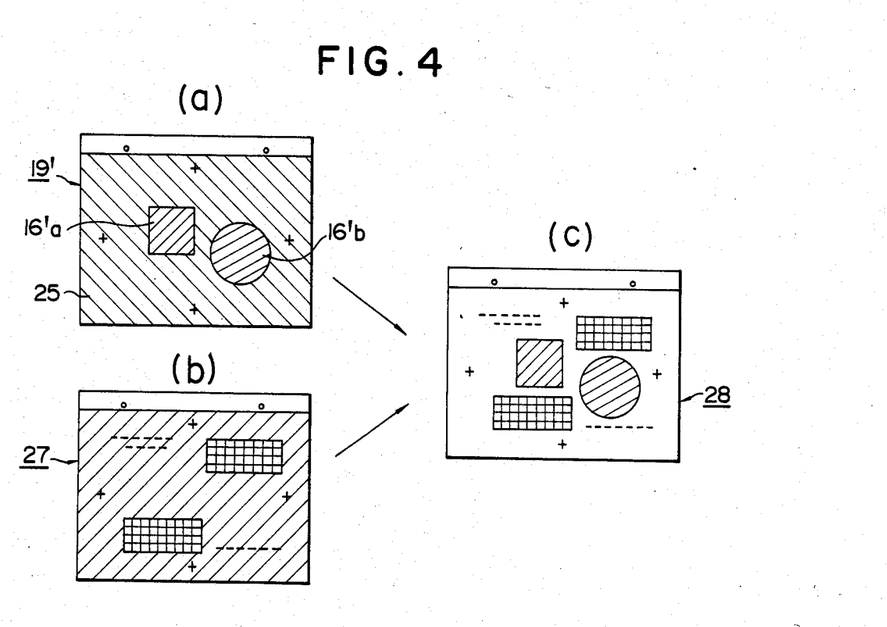
FIGS. 4(a), 4(b) and 4(c) are views each shows respectively composed patterns produced by exposing doubly a color separated film according to the present invention and a line pattern film made by other means on a film.

In FIG. 2(a) there are shown the base sheet 21 loaded on the pickup drum 2 and two color original pictures 16a and 16b which are pasted up on the base sheet 21. In FIG. 2(b) there is shown a picture image obtained by developing the photosensitive film 19 which is acquired by scanning and exposing (a) (shown in Fig. 2(a)) by the apparatus in FIG. 1. The base sheet 21 is constructed, as shown in FIG. 3, by laminating a transparent film base 21a and a white colored peel-off layer 21b having high surface reflectivity, and there are bored at least two pin holes 21c to be fitted with register pins disposed on the pickup drum 2 to perform more exact positioning.

On the other hand, the photosensitive film 19 is substantially same in size as that of the base sheet 21, and as well as it there are also bored pin holes 19a. The register pins fitted into the pin holes 21c or 19a are bored with pin diameters and pitches commonly applied to works for the scanning drum 2, the recording drum 7, a CAD (Computer Aid Design which will be described hereinafter), a contact printer or supporting jigs. The pin and punch hole system for above described "positioning" is a customary technique, so that detailed description is abbreviated.

On the base sheet 21, according to a layout designated by a "composing design", two transparent trimming windows 24a and 24b which are made by removing the white colored peel-off layer 21b corresponding to areas desired to be reproduced from the original pictures 16a and 16b are provided. The procedure for cutting off the trimming window 24a and 24b has no relation with the gist of the present invention, so that detailed description therefor is abbreviated. However, if there are necessities for configuring shape or size of trimming areas with high accuracy, it is preferable to cut off the trimming windows in exact positioning by using "pattern processing technique" such as the CAD system etc.

For the original pictures 16a and 16b, it is preferable to use secondary original pictures reproduced on a duplicate film by magnifying or reducing in desired magnification, and making mutual tone and gradation characteristics equivalent with each other.

In the case of the original pictures 16a and 16b being pasted up on the base sheet 21, as shown in FIG. 3, with the transparent layer 21a of the base sheet 21, base sides of the original films are come to be contacted, and by positioning so that each of the desired areas of the original pictures 16a and 16b may be aligned with the respective transparent windows 24a and 24b provided on the base sheet 21, they are pasted up on the respective transparent windows 24a and 24b. This work is same as that in typical "composing layout work".

In the lower part of FIG. 3 there are shown graphs of the color separated image signal (g1) based on the first cell (13) (only one channel among R, G and B three channels is shown.), the signal (e2) from the second photoelectric cell 14 and the signals (g2), (g3) and (e3) basing on them ((g1) and (e1)). The first cell 13 receives an illuminating light 15a from the light source 15, scans the original picture 16a in the window area 24a removed from the layer 21a, and outputs the image signal. In areas other than the window 21a in which the white colored layer 21b are remained, even if some of the illuminating light passes through, its intensity is, as shown in FIG. 3 as the signal (g1), detected in attenuation.

The second photoelectric cell 14 detects light from the light source 20 which is reflected on the surface of the white colored layer 21b which are still remained in an area out of the window 24a. The reflected light is shown in FIG. 3 as the signal (e1), in the area where the layer 21b exists, the reflected light is in "H" (high level). On the other hand, in the area of the window 24a, it passes through to the opposite side or is absorbed into the original picture 16a to become the "low level". The "high" or "low" level of the output (e2) of the second photoelectric cell 14 is compared with a certain reference level by a comparator 22, and converted into "ON-OFF" binary signal. The comparator 22 inputs the "high level" detection signal to the gate 18 through the buffer 23 as a signal in an area in which the layer 21b reamins is scanned, and controls the gate 18.

As described the above, in the reproduced picture image shown in FIG. 2(b), at original picture side an area 25 corresponding to the area in which the layer 21b remains is exposed by a light intensity of which is at least capable of recording halftone dot of 100% area ratio or more intense light (the (e3) level shown in FIG. 3), and when an image on the film 19 is contact printed to other photosensitive material, the area 25 is sufficiently blackened so that it may serve as a mask for shielding a printing light.

On the other hand, in the trimming areas 24a and 24b the signal (g2) from the signal processing means 17 passes through the gate 18, and color separated picture images are recorded as halftone pictures 16a′ and 16b′.

As described the above, an exposed and developed color separated image film 19′ has the areas 16a′ and 16b′, and as there is produced halftone pictures in the areas 16a′ and 16b′, and that around the areas are sufficiently blackened, in the case of performing contact printing in the post processing, the "cut mask" (another name being "knock out mask") having been used conventionally is unnecessary.

In FIG. 1 the first cell 13 and the second cell 14 are disposed in alignment with each other in the sub-scanning direction (i.e., in the axial direction of the pickup drum 2), but they may be disposed in the main scanning direction (i.e., in the circumferential direction of the pickup drum 2). In the latter case the maximum capacity of the buffer memory 23 is sufficient to a portion per scanning line.

Figure 5:
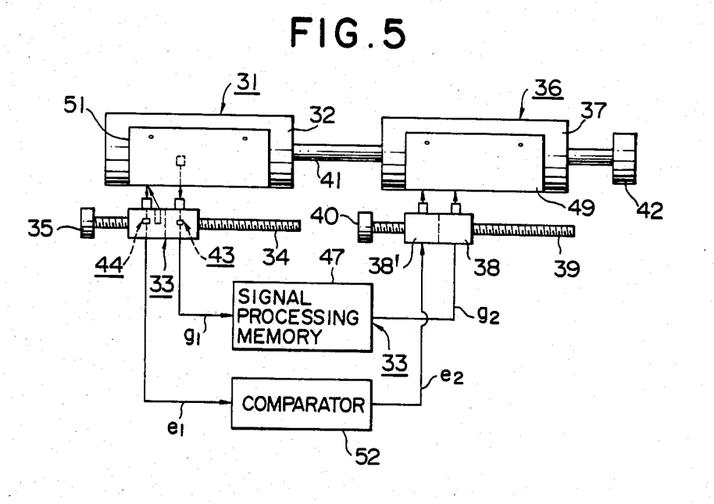
FIGS. 5, 6, 7 and 8 are block diagrams, each showing a color scanner to which a respective different embodiment of the present invention is applied.

FIG. 5 is a block diagram showing another embodiment of the present invention.

In this embodiment an input module 31 comprising a scanning drum 32, a pickup head 33, a feed screw 34 and a motor 35 etc., recording module 36 comprising a recording drum 37, recording heads 38,38′, a feed screw 39, a motor 40 etc., a shaft 41 and a motor 42 etc. are almost same means as having been already described with respect to FIG. 1, but differs only in the construction of the two sets of heads. That is, in this embodiment a first pickup head 43 and a second pickup head 44 are disposed at a certain space in the input module 31, and in the recording module 36 the first recording head 38 and the second recording head 38′ are disposed with the same space as the forementioned. The first pickup head 43 and the first recording head 38 are same ones as used in a conventional color scanner, and the head 43 photoelectrically scans original pictures 51 loaded on the scanning drum 32, and outputs the primary color separated image signals (g1). The signals (g1) are converted into the recording signals (g2) by a signal processing means 47 and send to the head 38 for recording color separated images to a photosensitive material 49 which is loaded in the recording drum 37.

On the other hand, the second pickup head 44 scans, same as the second cell 14 shown in FIG. 1, a high reflective mask of a desired shape which is overlaid on the original picture, and at a masked area by the mask the signal (e1) of "H" level and at no masked area the signal (e1) of "L" level are output. The signal (e1) is converted into the ON-OFF binary signal (e2) by a comparator 52, and input to the second recording head 38′.

The second recording head 38' takes either exposing or non-exposing output state according to the signal (e2), thereby patterns corresponding to the configuration of the high reflective mask are recorded on the photosensitive material 49. Light intensity at the case when the head 38' is in the exposing state which may be of a level such that, in the means shown in FIG. 1, an exposed area of the material 49 may be sufficiently blackened after having been developed so that it may present a "mask effect" during contact printing in the post-processing.

The sequence of mutual disposition of the respective two heads in the input module 31 and the recording module 36 may be reverse to that of shown in FIG. 5. That is, the sequence of picking up and recording the color pictures and the mask makes no difference. However, the distance between the respective heads in the two sets of the modules (31) and (36) must exactly coincide so that position of the mask in the reproduced images is prevented from being slipped-off.

Further, the second recording head (38') in the second embodiment in FIG. 5 uses a micro typed semiconductor laser as a light source, and the mask pattern may be exposed by ON-OFF controlling.

Figure 6:
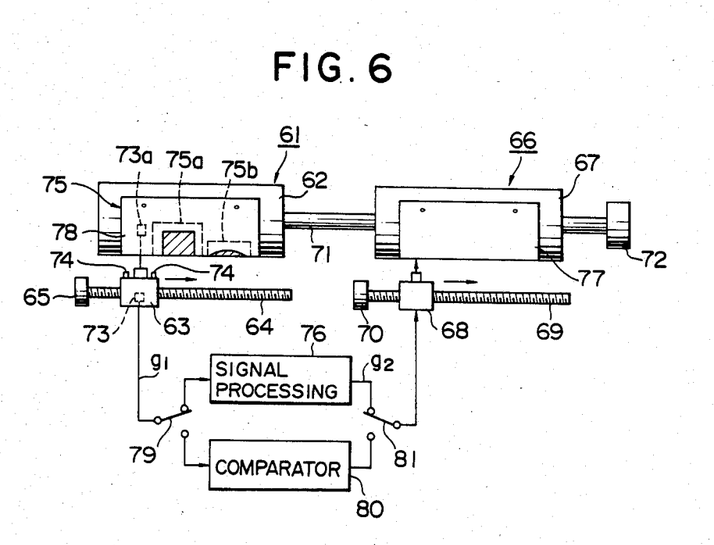
Figure 7:
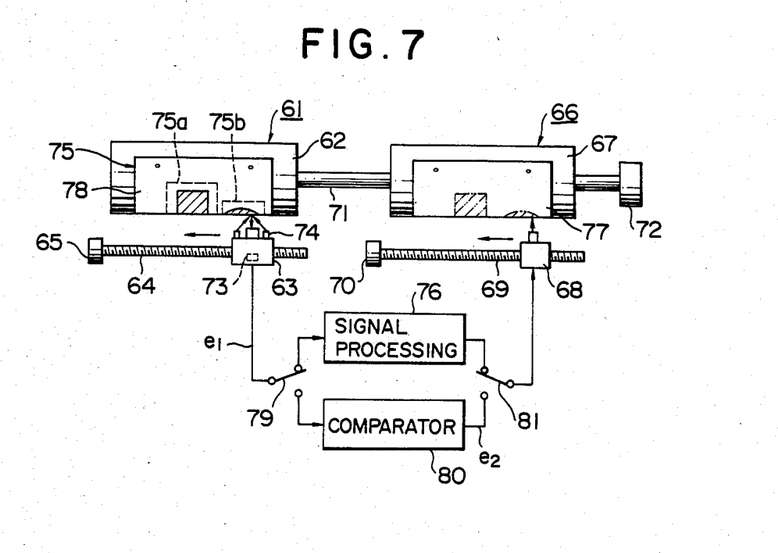

In FIG. 6 and FIG. 7, there are shown the third embodiment, and in FIG. 6 there is shown a state recording the color separated images of the original patterns, and in FIG. 7 another state of recording the mask. This embodiment comprises, as same as the previous two embodiments, an input module 61 having a scanning drum 62, a pickup head 63, a feed screw 64, a motor 65 etc., a recording module 66 having a recording drum 67, a recording head 68, a feed screw 69, a motor 70 etc., a common shaft 71 and a motor 72.

In the pickup head 63 there are provided a lamp for a transparent original 73a disposed in the inside of the scanning drum 62, a lamp for a reflection sheet (74) disposed at the outside of the drum 62 and a photoelectric cell 73. A light band radiated from the lamp 73 and passed through a color original picture 75a or 75b loaded on the drum 62 together with the mask having high reflective surface and formed desired shaped transparent windows thereon is incident into a photocell 73 of the head 63, and as in a typical color scanner it outputs the primary color separated image signals (g1). These signals (g1) input to a signal processing means (76) through a changeover switch 79.

The signal processing means 76 outputs the recording color separated image signals (g2), the signals (g2) input to the recording head 68 through another changeover switch 81, and record reproduced pictures on the photosensitive material 77 which is loaded on the recording drum 67.

After the above described color separation recording has finished, as shown in FIG. 7, the lamp of the pickup head 63 is switched towards the reflective lamp 74, and the two head 63 and 68 are moved in the inverse direction to that of shown in FIG. 6, and scan the mask area. Scanning this mask area can be performed prior to color separation recording of the color original pictures.

In scanning the mask area, as in the afore-mentioned embodiments, the output (e1) of the cell 73 of the pickup head 63 is "H" level at an area where a high reflective layer of a sheet 78 is remained, and at the window area from which the layer is removed, that is, at the color transparent area the output level is "L" level. This signal (e1) is input to a comparator 80 through the changeover switch 79 and converted into the binary signal (e2). Then the signal (e2) is input to the recording head 68 to record desired shaped masks.

Figure 8:
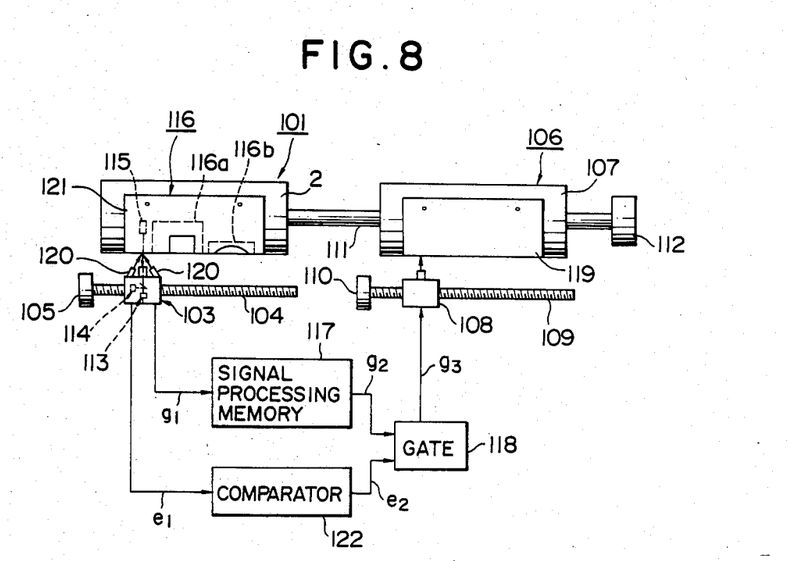
Figure 9:
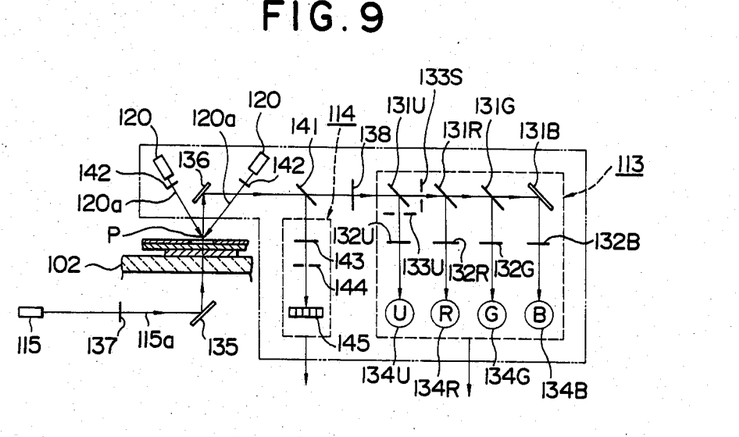
FIG. 9 is a schematic construction of a photo-electric converting part in a pickup head in the apparatus shown in FIG. 8.

FIG. 8 is a block diagram of the fourth embodiment of the present invention, and FIG. 9 is a view showing a construction of a pickup head of the fourth embodiment. This embodiment comprises an input module 101 having a scanning drum 102, a pickup head 103, a feed screw 104, a motor etc. and a recording module 106 having a recording drum 107, a recording head 108, a feed screw 109, a motor 110 etc. The scanning drum 102 and the recording drum 107 are revolved by a motor 112 through a common shaft 111. On the scanning head 103 two photoelelctric cells 113 and 114 are mounted. The first photoelectric cell 113 scans original color pictures 116a and 116b by a light flux radiated from a lamp 115 for a color transparency, outputs the primary color separated image signals (g1) and feeds the signals to a signal processing means 117. The signals (g2) converted by the signal processing means 117 are input to the recording head 108 through a gate 118 to record reproduced color separation pictures on the photosensitive materials 109 loaded on the recording drum 107. The second cell 114 scans the surface having high reflectivity of a sheet 121 by a lamp for reflection which scans and records the mask area, and its output signal (e1) is converted, as in each of the afore-mentioned embodiments, into a binary signal (e2) of "H" or "L" by a comparator 122, and then input to the gate 118 to cause the afore-mentioned signals (g2) to pass through or interrupt. When the binary signal (e2) is in "H" level, a signal (g3) is output from the gate 118 to the recording head 108, and from the head 108 a light quantity sufficient for completely blackening the photosensitive material 119.

When the binary signal (e2) is in "L" level, the signal (g2) passes through the gate 118, and a reproduced color separation picture is recorded on the photosensitive material 119. FIG. 9 shows the constructions of the first and the second photoelectric cells 113 and 114 shown in FIG. 8.

The first cell 113 has a construction, similar to each of the afore-described embodiments, that is, it has a construction nearly same as that of well known color separation photoelectrical means. In the construction a light flux obtained by illuminating the original color picture 121 loaded by the scanning drum 102 through the transparency lamp 115 is received with a mirror 136, and the construction comprises half mirrors 131U, 131R, 131G and a mirror 131B which branch one unsharp signal channel and three color channels, an aperture 133U bored in the unsharp signal channel and having a large diameter and another aperture 133S bored in the color channel and having a smaller diameter, each of color filters 132U, 132R, 132G and 132B mounted on the respective channels, and photocells 134U, 134R, 134G and 134B which photoelectrically convert unsharp signal (U) and three kinds of color separation signals (R), (G) and (B) by receiving a light flux passed through these filters.

On the optical passage immediately at the rear position of the lamp 115 and immediately at the front position of the photo cell 113, there are disposed an infra-red ray blocking filters 137 and 138, respectively. On the other hand, from the lamp for reflection 120 disposed at the outside of the scanning drum 102, infra-red ray is emitted to a scanning point (P), and a reflected light flux from the scanning point (P) is reflected by a mirror 136 and a half mirror 141, and incident to the second cell 114. At an immediately rear position of the lamp 120, there is provided visual light ray cutting filters 142 which pass infra-red rays but block visual light rays. A same visual light ray blocking filter 143 is also disposed at the same position as mentioned above of the second photo cell 114. Preferably the half mirror 141 is a mirror which passes the visual light ray and reflects the infra-red ray.

In the second photo cell 114, the infra-red ray passing through the visual light ray blocking filter 143 is incident to a photo cell 145 through an aperture 144. Diameter of the aperture 144 is the same as that of the smaller aperture 133S for a color channel of the first cell 113.

According to the afore-mentioned constructions, the first photo cell 113 and the second photo cell 114 can perform photoelectrical scanning by letting transmitted light and reflected light at an identical scanning point be independent on with each other, and without effecting any on mutually measured light values by the infra-red ray blocking filters 137, 138 and the visual light ray blocking filters 142, 143.

Figure 10:
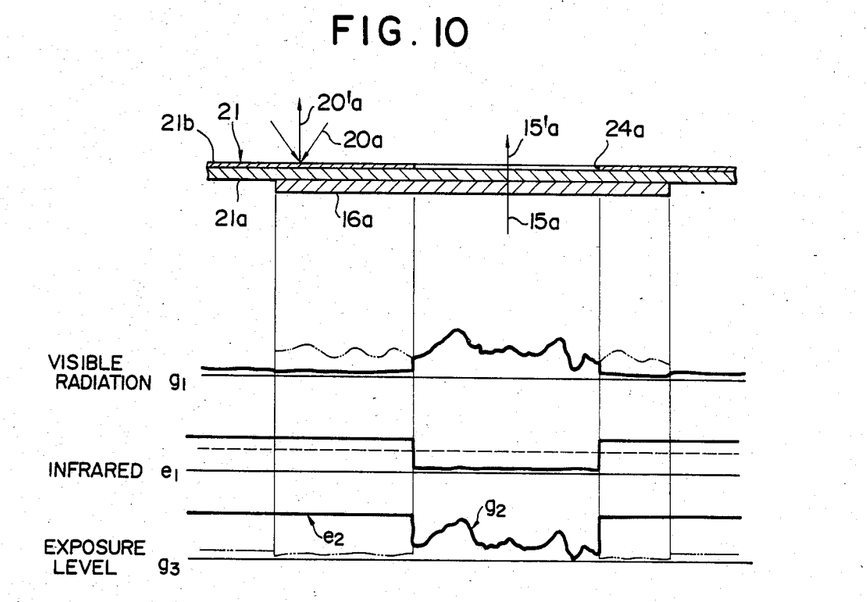
FIG. 10 shows, as shown in FIG. 2, a sectional view of one of the original pictures cut along line X—X and wave shape graphs of photo-electric converting signals when scanning is carried out by the means shown in FIG. 8.

FIG. 10 is a view showing diagrammatical graphs of waveshape of the color separation signal (g1) (however, one among R,G and B channels is shown) by the first photo cell 113 when the cell scans the original picture 16 along X—X line shown in FIG. 2(a) by the means shown in FIGS. 8 and 9, and that of the mask recording signal (e1) by the second cell 114. The signals (g1), (g2), (g3), (e1) and (e2) in these graphs may be understood from the description regarding FIG. 3, so that a detailed description is abbreviated.

In the fourth embodiment when the recording head 118 provided with a dot generator is used, by utilizing the photo cell 145 in the second cell 114 as a line sensor, as described in the Japanese Patent Application No. 58-100236 (the corresponding U.S. patent application Ser. No. 616,389; British Patent Application No. 8413578; and German Patent Application No. P3420482.2) filed by the very Applicant, contour of trimming can be smoothed.

In each of the above described embodiments descriptions have been made with respect to the case in which the color transparency is used as the original picture 16a or 16b, however, the present invention can be also applied in a reflection mode. In the reflection mode, if a white paper having a surface reflective coefficient higher than a reflection copy having the maximum reflective coefficient among the reflection copies (i.e., high-light point in a positive picture) is used as a base sheet, by means of the comparator the difference in the reflective coefficients between the reflection copy and the base sheet can be discriminated, so that the present invention can be applied.

Heretofore, descriptions have been made for a case, "negative case", that is, where a reproduced color separation picture image is made to be "negative" and the trimming mask area to be blackened part, however, the present invention may be also applied in a "positive mode" case. That is, if described regarding FIG. 1, when the mask area of the original picture 16 (i.e., white colored area) is detected, the recording head 8 is controlled so that record half tone pattern of area rate 0% may be recorded, and when the trimming window 24a or 24b is detected, the recording head 8 is controlled so that the color separated image signals reversed to positive may be input to itself. In addition, it is possible to record halftone patterns of any area ratio on the mask area. The mask area of the original picture can be used a white paper instead of the above described white peel-off film.

What is claimed is:

1. A method for producing a color separation picture image with an electronic color scanner by trimming desired areas of an original picture, comprising the steps of:

covering undesired areas of said original color picture with a mask sheet having a surface with a high reflection coefficient;
   photoelectrically scanning said mask sheet and said original color picture with a first light source cooperating with a first photoelectrical converting means and a second light source cooperating with a second photoelectrical converting means, wherein
   (i) said first photoelectrical converting means outputs a signal for recording a color separation produced picture image by scanning said original color picture; and
   (ii) said second photoelectrical converting means outputs a signal based on the light reflecting from the surface of the mask sheet;
   converting said surface reflecting signal from said second photoelectrical converting means into a binary signal of a first or second level with a level comparator; and
   controlling a scanning recording means such that when said binary signal is a first level indicating the presence of an area of said reflecting mask sheet, a photosensitive material is exposed with a predetermined level of light, and when said binary signal is a second level indicating an area in which said reflecting mask sheet does not exist, said photosensitive material is exposed with said signal from said first photoelectrical converting means for recording said color separation reproduced picture image.

2. A method as claimed in claim 1, wherein said first and second photoelectrical converting means are attached to a single scanning means and are separated by a predetermined distance on said scanning means corresponding to a certain time interval when said scanning occurs.

3. A method defined in claim 2, wherein the preceding signal of said output signals from said first and said second photoelectrical converting means is delayed by a time length equivalent to said time interval so that the timing of said two signals may be synchronized with each other so that coincident exposure on said photosensitive material may be controlled by a single recording exposure means.

4. A method as claimed in claim 2, wherein a first and a second scanning means are disposed at the recording side at the same distance apart as said first and second photoelectrical converting means, and said and second scanning means are respectively controlled by the signal output from said first and second photoelectrical converting means.

5. A method as defined in claim 1, wherein said first and said second photoelectrical converting means comprise a single photoelectrical converting means, said color separation picture image of the original picture is recorded on said photosensitive material in accordance with the output signal of said single photoelectrical converting means when said original picture is scanned by a first light source cooperating with said single photoelectrical converting means, and said photosensitive material is exposed with a predetermined level of light when said reflective mask sheet is scanned by a second light source cooperating with said single photoelectrical converting means and when the output of said comparator is a first level.

6. A method as defined in claim 1, wherein said first light source generates light in the visible light spectrum and said second light source generates light in the infrared spectrum, both of said sources irradiate the same portion of said original picture, said first light source for obtaining said signal from said first photoelectrical converting means for recording said color separation reproduced picture image being configured such that the transmitted light passes through a filter which transmits visible light and blocks infrared radiation, and second light source for obtaining said signal from said second photoelectrical converting means being configured such that said reflecting light pases through a filter which transmits infrared radiation and blocks visible light.

7. A method as defined in cliam 1, wherein said mask sheet is a peel-off film having a white colored peel-off layer.

8. An apparatus for recording color separated picture images of original pictures and trimming mask patterns, comprising:
 a trimming mask sheet comprising a material having a high reflection coefficient which covers portions of said original color picture and remaining areas which are to be eliminated when
 a first photoelectrical converting means for outputting a color separated picture image signal by photoelectrically scanning said first original picture;
 a second photoelectrical converting means for outputting signals based on the presence or absence of said trimming mask having a high reflection coefficient by scanning photoelectrically said original picture;
 a comparator for converting said signals from said photoelectrical converting means into binary signals; and
 a scanning means at the recording side which scans and records color separated picture images by scanning and exposing a photsensitive material at locations on said recording side corresponding to said trimming mask areas having high reflective coefficient with a light intensity of a predetermined level and at locations corresponding to the unmasked areas with a light intensity based on the signal from said first photoelectrical converting means;
 said areas of the mask sheet having high reflective coefficient being discriminated from the unmasked areas by the level of the binary signals from said comparator.

9. An apparatus as claimed in claim 8, wherein said first and said second photoelectrical converting means scan the original picture at a certain distance apart, and by delaying the signal from the preceding photoelectrical converting means a corresponding time interval for-synchronizing the timing of said two signals, the scanning means at the recording side is controlled.

10. An apparatus as defined in claim 8, wherein said first and second photoelectrical converting means scan said original picture at a certain distance apart, said scanning means at the recording side comprises a first and second exposing and scanning means which scan and expose said photosensitive material also at said certain distance apart, and are respectively controlled by the signals coming from said first and second photoelectrical converting means.

11. An apparatus as defined in claim 8, further comprising a first light source for generating light in the visible spectrum and a second light source for generating radiation in the infrared spectrum, whereby light from said first and second light sources irradiates an identical portion of said original picture, and whereby transmitted light is incident to said first photoelectrical converting means through a filter which passes visible light and blocks infrared radiation, and reflected light is incident to said second photoeletrical converting means through a filter which passes infrared radiation and blocks visible light, and whereby scanning and recording is carried out in accordance with the signals from said first photoelectrical converting means and the binary signals from said comparator.

12. A method for reproducing a color separation picture image with an electronic color scanner by trimming desired areas of an original picture, comprising the steps of:
 covering undesired areas of said original color picture with a mask sheet having a surface with a high reflection coefficient;
 photoelectrically scanning said mask sheet and said original color picture with a first and a second photoelectrical converting means, wherein
 (i) said first photoelectrical converting means scans said original color picture and outputs a signal for recording a color separation reproduced picture image; and
 (ii) said second photoelectrical converting means scans said mask sheet and outputs a signal for discriminating the mask sheet areas from areas where no mask sheet exists;
 said first and said second photoelectrical converting means are disposed on said scanning means within a certain distance of each other, and said first and second photoelectric converting means output respective signals with a time delay therebetween when they respectively scan each point of the original color picture;
 the preceding signal of said output signals from said first and said second photoelectrical converting means is delayed by a time period such that said two signal are synchronized for the purpose of controlling said scanning means at the recording side; and
 controlling a scanning means at the recording side in accordance with the output of a comparator responsive to the output level of said second photoelectrical converting means, so that at said mask areas a photosensitive material is exposed by a certain light intensity and at the other areas where no mask exists said photoelectric material is exposed by said color separation picture image from said first photoelectrical converting means.

13. A method for reproducing a color separation picture image with an electronic color scanner by trimming desired areas of an original picture, comprising the steps of:
 covering undesired areas of said original color picture with a mask sheet having a highly reflective coefficient surface;
 scanning photoelectrically said mask sheet and said original color picture by a first and a second photoelectrical converting means, wherein (i) said first photoelectrical converting means scans said original color picture and outputs a signal for recording a color separation reproduced picture image; and (ii) said second photoelectrical converting means scans said mask sheet and outputs a signal for discriminating the mask sheet areas from areas where no mask sheet exists;

said first and said second photoelectrical converting means are disposed on the same pickup scanning means, and simultaneously scan the same point on the original picture to control a scanning means at the recording side; and controlling a scanning means at the recording side in accordance with the output of a comparator responsive to the output level of said second photoelectrical converting means so that at said mask areas a photosensitive material is exposed by a certain light intensity and at the other areas where no mask exists said photosensitive material is exposed by said color separation picture image from said first photoelectrical converting means.

14. An apparatus for recording color separated picture images of original pictures and trimming mask patterns, comprising:

a trimming mask sheet comprising a material having high reflective coefficient which covers portions of said original color picture and remaining areas which are to be eliminated when reproduced by trimming;

a first photoelectric converting means for outputting a color separated picture image signal by photoelectrically scanning said first original picture;

a second photoelectric converting means for outputting a signal based on the presence or absence of said trimming mask sheet having a high reflection coefficient by scanning photoelectrically said original picture;

a comparator for converting said signals from said second photoelectric converting means into binary signals: and a scanning means at the recording side which scans and records color separated picture images by scanning and exposing a photosensivitive material at locations on said recording side corresponding to said trimming mask areas having high reflective coefficient with a light intensity of a predetermined level and at locations corresponding to unmasked areas with a light intensity based on a signal from said first photoelectrical converting means, the mask sheet areas being discriminated from the unmasked areas by the binary signals from said comparator;

wherein said first and said second photoelectrical converting means scan the original picture at a certain distance apart, and by delaying the signal from the preceding photoelectrical converting means a desired time duration for synchronizing the timing of said two signals, the scanning means at the recording side is controlled.

15. An apparatus for recording color separated picture images of original pictures and trimming mask patterns, comprising:

a trimming mask sheet comprising a material having high reflective coefficient which covers portions of said original color picture and remaining areas which are to be eliminated when reproduced by trimming;

a first photoelectric converting means for outputting a color separated picture image signal by photoelectrically scanning said first original picture;

a second photoelectric converting means for a signal based on the presence or absence of said trimming mask sheet having a high reflection coefficient by scanning photoelectrically said original picture:

a comparator for converting said signals from said second photoelectric converting means into binary signals; and a scanning means at the recording side which scans and records color separated picture images by scanning and exposing a photosensitive material at locations on said recording side corresponding to said trimming mask areas having high reflective coefficient with a light intensity of a predetermined level and at locations corresponding to unmasked areas with a light intensity based on a signal from said first photoelectrical converting means, the mask sheet areas being discriminated from the unmasked areas by the binary signals from said comparator;

wherein said first and second photoelectrical converting means pick up the identical point at the same time, and by switching signals output from said first and second photoelectrical converting means, said scanning means at the recording side is controlled.

* * * * *